United States Patent [19]

Jaw-Jia

[11] Patent Number: 5,325,688
[45] Date of Patent: Jul. 5, 1994

[54] ASSEMBLY OPTIONAL MULTI-PURPOSE AUTOMOBILE LOCK

[76] Inventor: J. Jaw-Jia, 6/F, No. 36-5, He-Ping Road, Pan-Chiao City, Taipei County, Taiwan

[21] Appl. No.: 58,127

[22] Filed: May 10, 1993

[51] Int. Cl.$^5$ .............................. B60R 25/02
[52] U.S. Cl. ........................ 70/200; 70/209; 70/226; 70/238
[58] Field of Search ............... 70/209, 225, 226, 237, 70/238, 198-200, 212

[56] References Cited

U.S. PATENT DOCUMENTS

| | | | |
|---|---|---|---|
| 1,288,569 | 12/1918 | Hallock | 70/200 |
| 3,898,823 | 8/1975 | Ludeman | 70/209 X |
| 5,005,391 | 4/1991 | Gibson | 70/212 X |
| 5,082,213 | 1/1992 | Torres | 70/200 X |
| 5,129,245 | 7/1992 | Chang | 70/209 |
| 5,199,284 | 4/1993 | Lin | 70/209 |
| 5,230,232 | 7/1993 | Yang | 70/209 |

FOREIGN PATENT DOCUMENTS

| | | | |
|---|---|---|---|
| 2580243 | 10/1986 | France | 70/209 |
| 297498 | 9/1928 | United Kingdom | 70/200 |
| 1223123 | 2/1971 | United Kingdom | 70/199 |
| 2039840 | 8/1980 | United Kingdom | 70/209 |
| 2134057 | 8/1984 | United Kingdom | 70/209 |
| 2145679 | 4/1985 | United Kingdom | 70/237 |

Primary Examiner—Lloyd A. Gall
Attorney, Agent, or Firm—Bacon & Thomas

[57] ABSTRACT

A multi-purpose automobile lock, having a rod member and a catch structure with a side of one end of the rod member provided with an elongated channel in which are drilled several latching holes and tapped holes. At the other end of the rod member is disposed a hollow channel. The catch structure comprises a U type hook and a locking member, with the U type hook having at its center a tapped hole to lock in on the side of the channel. A pair of trapped holes are also provided on the lock. When both are latched, the channel is placed on the side of the steering wheel to achieve the summary lockup. This invention also permits the removal of the hook in order for the locking member to be screwed to the inner side of the channel. With the hollow channel at the other end of the rod member holding against the hand brake lever, and the hook latched to the shift lever, the device will lock up both the hand brake lever and the shift lever.

3 Claims, 7 Drawing Sheets

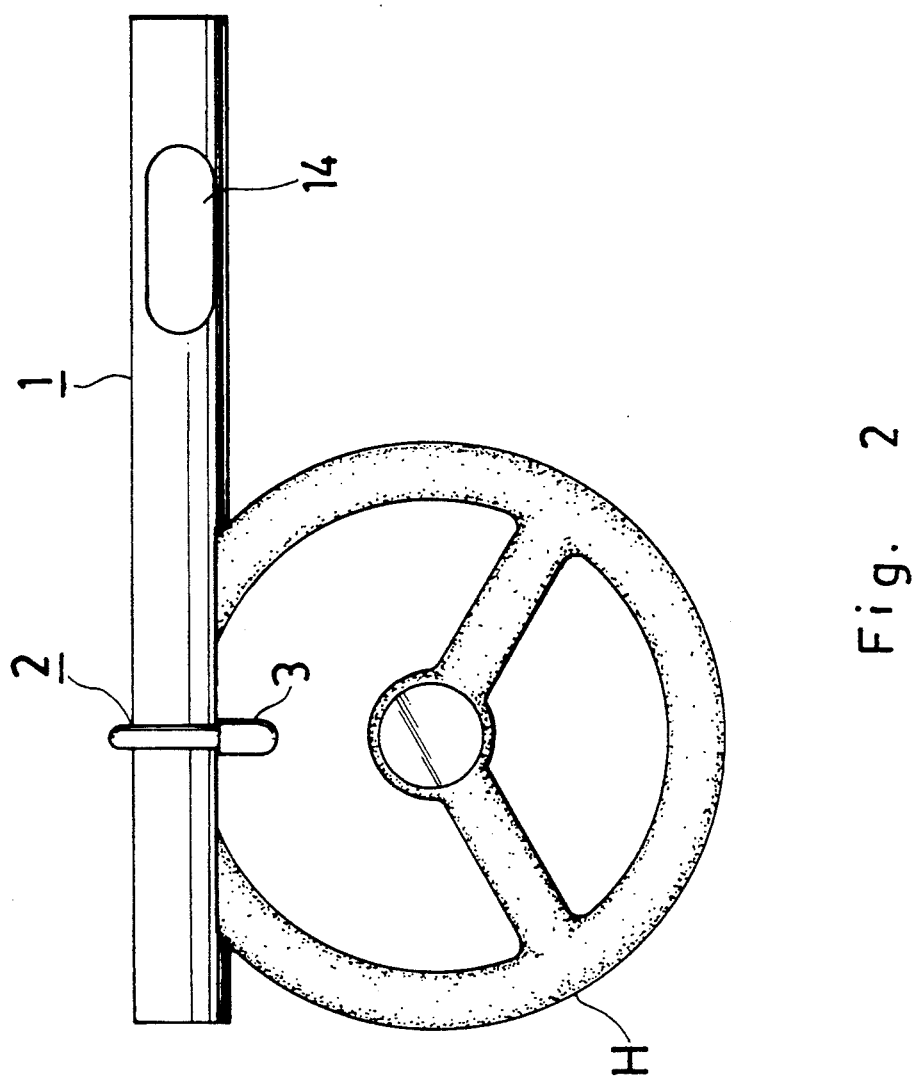

ASSEMBLY OPTIONAL MULTI-PURPOSE AUTOMOBILE LOCK

BACKGROUND OF THE INVENTION

The present invention relates to a multi-purpose automobile lock, which is comprised of a rod member and a catch structure. A side of one end of the rod member defines a channel bored with several sets of latching holes. Both sides of the other end define a hollow channel. A catch structure comprised of a U type hook and a locking member with the former having at its center a tapped hole to lock in to a corresponding tapped hole in the channel. The buckling surface of the locking member is also disposed with a pair of tapped holes so as to be located to achieve easy lockup. The latching of locking member and hook causes the channel to hold firmly to the side of the steering wheel. This invention permits the hook to be removed and the locking member screwed to an inner portion of the channel while the hollow channel at the other end of rod member may be used to hold against the hand brake lever. The hook is used to lock the device to the hand brake.

The prior art parking lock (See FIG. 4) is provided with a sleeve (6) within which is fitted a sectional tube (7) having sectional openings (72). On one end of the sleeve (6) and on one end of the sectional tube (7) are disposed inverse retaining hooks (61, 71) respectively. A locking head (8) is provided at the end where sleeve (6) receives the sectional tube (7) to control the length of extension of the sectional tube (7) from the sleeve (6). In use, said lock is placed above the steering wheel (H) as retaining hooks (61, 71) respectively at the end of the sleeve (6) and of the sectional tube (7) are held against the inner sides of the steering wheel (H) before inserting the key into the locking head (8) to lock up. However, a burglar may use one end of a hollow steel pipe(S) to deform retaining hook (61). The retaining hook (61) thus will be damaged and lock removed (See FIG. 4-1). Alternatively, a burglar may use the sawing blade (J) or other tools to cut a small portion of the steering wheel (H) and use the retaining hooks (61, 71) to exert a force on the sleeve (6) or on the sectional tube (7) to easily disengage the retaining hooks (61, 71) from where the cut off occurs. Such has been the major defect of the prior art devices in practical use. Later in the market there has been available a device referred to as "Suspension Side Stopping Lock for Automobile Steering Wheel" (See FIG. 5). Said lock comprises a wrapping tube, one hinged leaf, a lock and a stopping lever. The wrapping tube forms a receiving trunk, one end of which is provided with a recess and a latching ridge is disposed on the side abutted to said recess. Further, an arc recess is formed at the opening end inner side of the tube axially connected to the receiving trunk. On another end, the receiving trunk is provided with a hinged leaf pivoted by means of a rivet, said leaf which closing upon the receiving trunk of the wrapping tube, forms a closed round tube while allowing the arc recess to become an open end. One bottom cover is disposed on the extending hinged leaf so that, when the leaf closes upon the receiving recess, said bottom cover is locked in a recess. A lock is fixed to the bottom cover with its latch extending into a latching ridge when locked up. The stopping lever is fixed to the opening end of the wrapping tube near the arc recess for stopping involved components of the vehicle when the wrapping tube revolves along with the steering wheel. Said lock uses essentially the receiving recess of the wrapping tube in conjunction with the shape of hinged leaf to close upon the steering wheel and uses the latch at the side of the wrapping tube to extend into the latching ridge in the corresponding position at the side of the hinged leaf and the latching catch locks to the latching ridge by turning the key. However, such lock is only applicable to the steering wheel. The present invention eliminates the aforesaid disadvantages.

SUMMARY OF THE INVENTION

Essentially, the automobile lock of the present invention is comprised of a rod member and a catch structure with the side of one end of the rod member provided with an elongated channel drilled with several sets of latching holes and tapped holes. The catch structure comprises a U type hook and a locking member with a tapped hole at the center of the U type hook to lock up a corresponding side of the channel while the buckling surface of locking member is bored with a pair of tapped holes.

Accordingly, the chief object of the present invention is to provide multi-purpose automobile lock which by means of the latching of the lock and the hook with the channel fixed to the outer ridge of the steering wheel will achieve a summary lockup.

Another object of the present invention is to provide a multi-purpose automobile lock in which its locking hook may be removed and the lock to be fixed to the inner ridge of the snapping channel. Thus, by having the hollow channel at the other end of the rod member held against the hand brake lever and the hook latched to the shift lever, the device will lock up both the hand brake and the shift lever, to promote the multiple uses of said automobile lock.

BRIEF DESCRIPTION OF THE DRAWINGS

The present invention will become more readily apparent from the following description of the preferred embodiment of the present invention taken in conjunction with the accompanying drawing, in which:

FIG. 3-1 is an exploded perspective view showing an alternative assembly of the present invention;

FIG. 3-2 is a side view showing the present invention locking up both a hand brake and a shift lever;

FIG. 4-1 is a front view illustrating the automobile lock of the prior art;

FIG. 4-2 is a top view illustrating the automobile lock of the prior art; and

DETAILED DESCRIPTION OF THE PREFERRED EMBODIMENT

Figure 1:
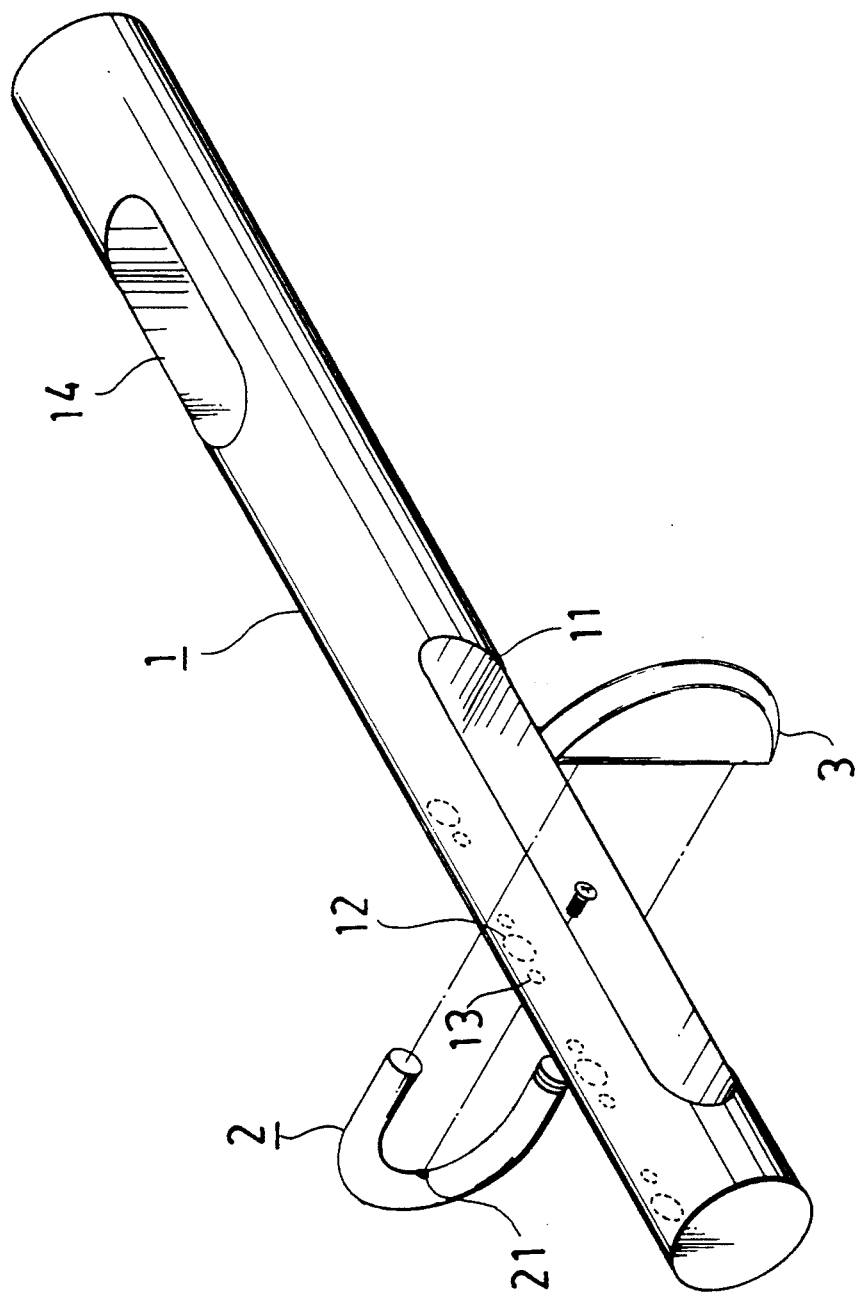
FIG. 1 is an exploded perspective view showing the construction of the present invention.

Referring to FIG. 1, the present invention of the optional assembly, multi-purpose automobile lock comprises a rod member (1) wherein one side adjacent to one end of the rod member (1) is provided with an elongated channel (11) while on the other side of that same end are drilled several latching holes (12) and tapped holes (13). At the other end of the rod member (1) is disposed a hollow channel (14). The latching holes (12) have larger diameters and are disposed in the middle of two smaller tapped holes (13). The several sets of latching holes (12) and tapped holes (13) are aligned in a position to appear within the corresponding region of channel (11). The catch structure comprises a U type hook (2) and a lock (3). The hook (2) has its center drilled with a tapped hole (21) to lock in one tapped hole (13) on the corresponding side of the channel (11) so that U type hook (2) is attached to the outer ridge channel (11). One pair of tapped holes (31) are drilled on the lock (3) and are spaced equal to that in between any two adjoining tapped holes (13) located between adjacent latching openings (12).

The present invention operates by using the channel (11) on one side of one end of the rod member (1) to latch to the outer circumference of the steering wheel (H) (See FIG. 2) so that said channel (11) wraps up on the grip of the steering wheel (H). The latching of the lock (3) and the U type hook (2) will achieve the summary lockup while a plane made of three points on the joint comprising both ends of the channel (11), the lock (3) and the hook (2) will hold securely the grip for preventing the rod member (1) from sliding on the steering wheel (H). The other end of the rod member (1) will restrict the turning of the steering wheel (H) description to this is well-known prior art and thus is omitted herein.

Figures 1, 3:
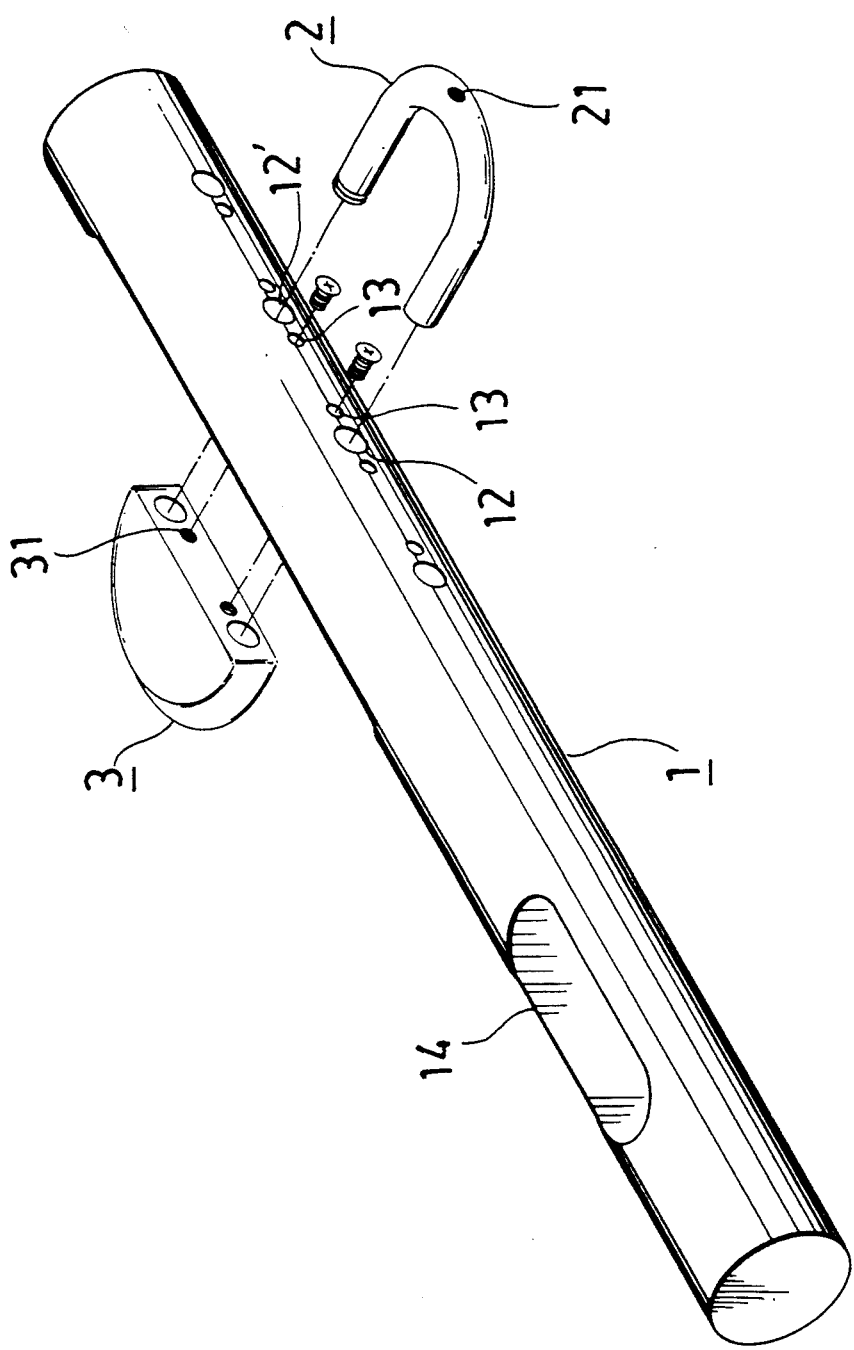
Figures 2, 3:
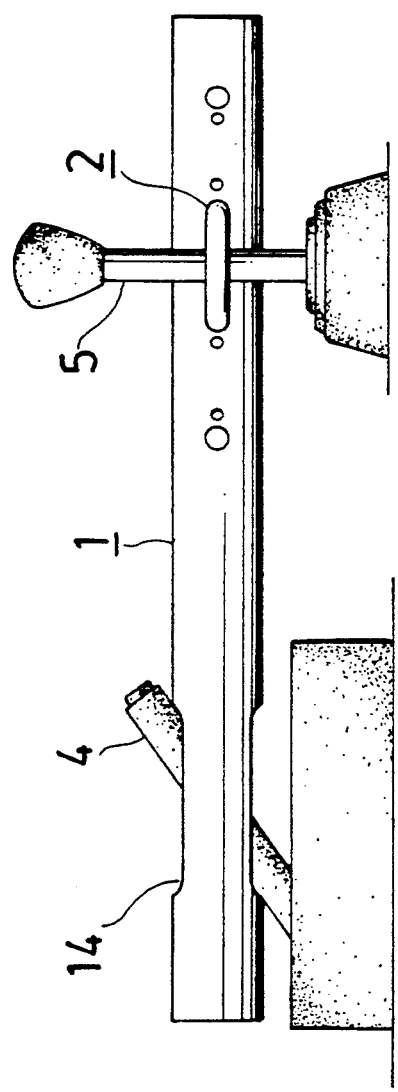
Figure 4:
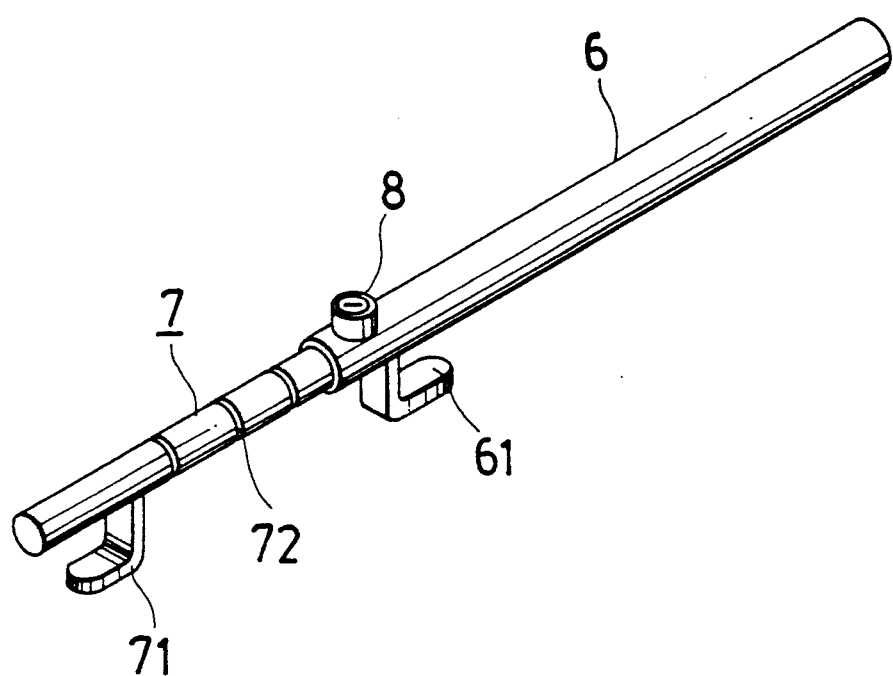
FIG. 4 is a perspective view of a prior art automobile lock.
Figures 1, 4:
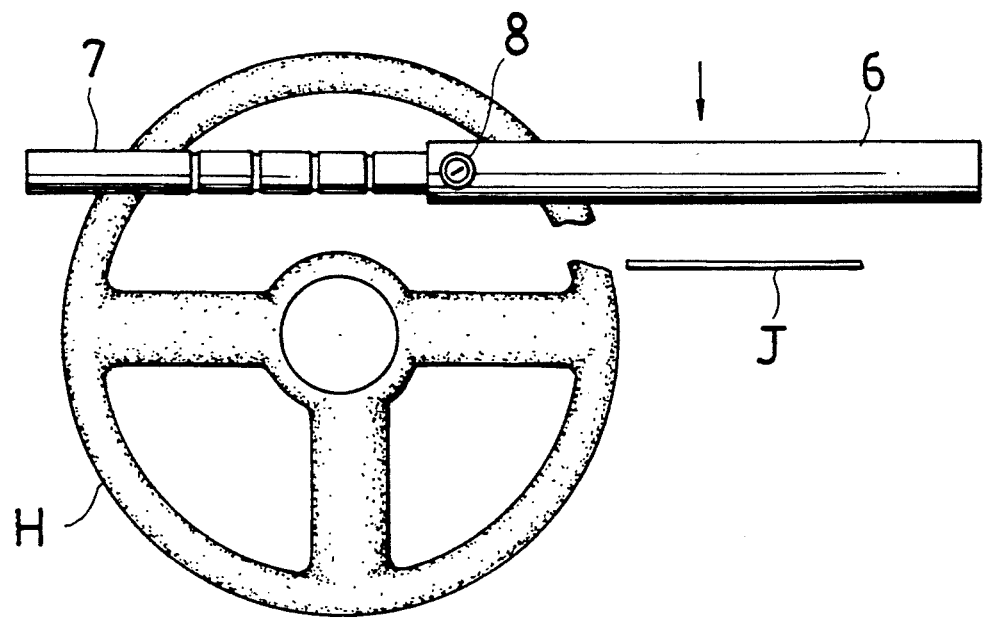
Figures 2, 4:
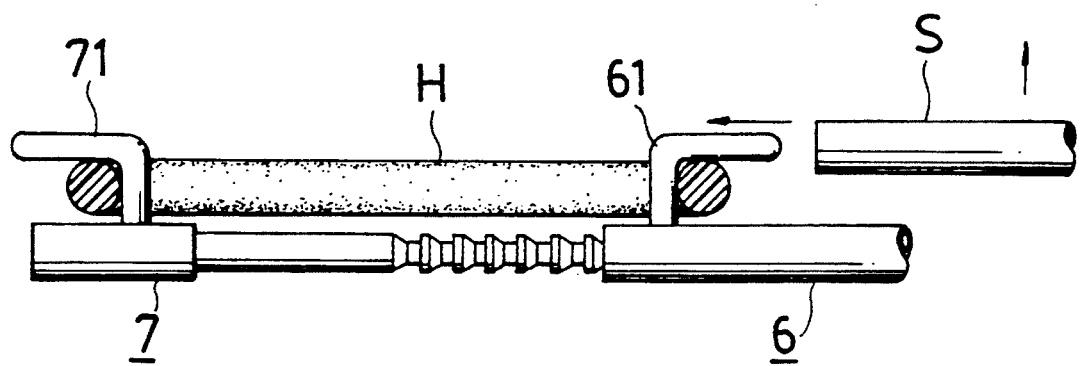
FIG. 2 is a front view showing the present invention locking up a steering wheel.
Figure 5:
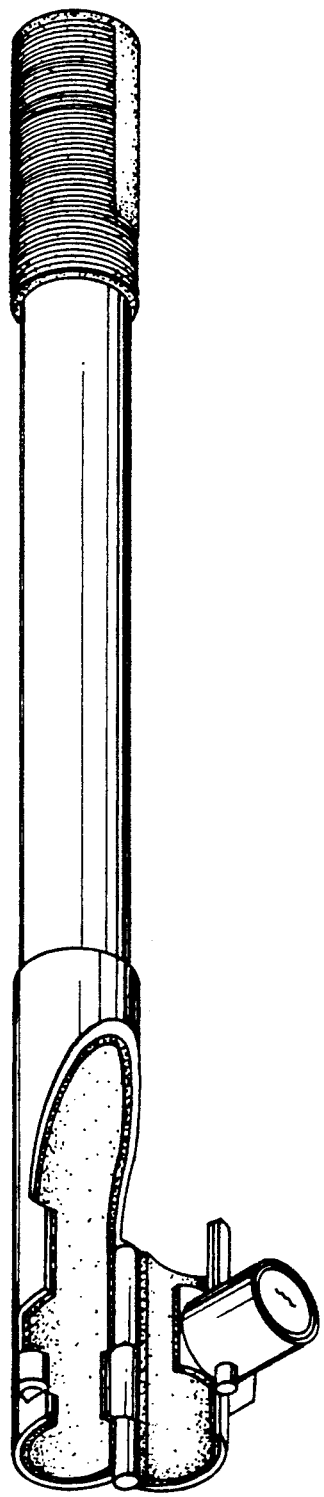
FIG. 5 is a perspective view of another prior art automobile lock.

By removing the U type hook (2) from the rod member (1), the lock (3) may be located in between any two adjoining tapped holes (13) on the corresponding side of the channel (11) so the lock (3) is received in the channel (11) as shown in FIG. 3-1. The hollow channel (14) on the other end of the rod member (1) then receives the hand brake lever (4) which has its top end protruding over the upper ridge of the hollow channel (14). The hand brake lever (4) at this moment indicates the pulled up state by using the hollow channel (14) to hold against the hand brake lever (4) and the other side of one end of the rod member (1) is attached to the side of the shift lever (5), by the U type hook (2) penetrating through any given two adjoining latching holes (12, 12') corresponding to the lock (3) to hold firmly the shift lever (5) in between the U type hook (2) and the rod member (1) as shown in FIG. 3-2. The device will simultaneously lock up both the hand brake lever (4) and the shift lever (5) for promoting diversified uses of said automobile lock of the present invention.

It is to be noted by using the aforesaid several sets of latching holes (12) and tapped holes (13) (See FIG. 1) aligned in a position, the driver may adjust the lockup position of the lock (3) depending on the spacing in between the shift lever (5) and the hand brake lever (4) for the present invention becoming applicable for various models of automobile.

What is claimed is:

1. A multi-purpose automobile lock adapted to be applied to a steering wheel to prevent rotation of the steering wheel, and between a parking brake lever and a shift lever to prevent movement of the levers, the lock comprising:
   a) an elongated rod member having first and second ends;
   b) a first elongated channel defined by the elongated rod member adjacent to the first end, the first elongated channel configured to accommodate a portion of a steering wheel rim therein;
   c) a second elongated channel defined by the elongated rod member adjacent to the second end of the elongated rod member;
   d) a generally U-shaped hook member having opposite ends;
   e) a lock configured to receive the opposite ends of the hook member;
   f) a plurality of latching holes defined by the elongated rod member, the latching holes communicating with the first elongated channel and spaced so as to receive the opposite ends of the hook member; and,
   g) attaching means separate from the hook member and latching holes to removably attach one of the hook member and the lock to the elongated rod member.

2. The multi-purpose automobile lock of claim 1 wherein the attaching means comprises:
   a) at least one first tapped hole defined by the elongated rod member and communicating with the first elongated channel;
   b) a second tapped hole defined by the hook member; and,
   c) threaded fastener means extending through the at least one first tapped hole into the second tapped hole.

3. The multi-purpose automobile lock of claim 1 wherein the attaching means comprises:
   a) a plurality of first tapped holes defined by the elongated rod member and communicating with the first elongated chamber;
   b) a plurality of second tapped holes defined by the lock; and
   c) threaded fastener means extending through the first tapped holes into the second tapped holes.

* * * * *